United States Patent [19]

Green

[11] Patent Number: 4,746,682

[45] Date of Patent: May 24, 1988

[54] POLYURETHANE FLAME RETARDANT

[75] Inventor: Joseph Green, East Brunswick, N.J.

[73] Assignee: FMC Corporation, Philadelphia, Pa.

[21] Appl. No.: 32,655

[22] Filed: Apr. 1, 1987

[51] Int. Cl.$^4$ ............................................. C08G 18/30
[52] U.S. Cl. .................................. 521/107; 521/114; 524/710; 524/712; 524/758
[58] Field of Search ................. 521/107, 114; 524/710, 524/712, 758

[56] References Cited

U.S. PATENT DOCUMENTS 4,433,071 2/1984 Fesman ................................ 521/107
4,565,833 1/1986 Buszard et al. ..................... 521/107

OTHER PUBLICATIONS

Rose et al., "A Novel Flame Retardant for Flexible Polyurethane with Improved Scorch and Smolder Resistance", J. Fire Retardant Chemistry, 9, pp. 155-158 (8/82).
Kirk-Othmer, *Encyclopedia of Chemical Technology*, 3rd Ed., vol. 10, John Wiley & Sons, N.Y. (1980) pp. 384-387; 400-409.
State of California, Technical Bullettin 117, Jan. 1980.
Fidelle, T. P., "Flame Retardants", *Modern Plastics Encyclopedia* 1985-1986, pp. 142 and 145 (1986).
FR Additive Cuts Urethane Foam Rejects, *Plastics World*, Sep. 1986, p. 48.

*Primary Examiner*—Maurice J. Welsh
*Assistant Examiner*—S. A. Acquah
*Attorney, Agent, or Firm*—Richard E. Elden; Robert L. Andersen; Eugene G. Seems

[57] ABSTRACT

A liquid composition is provided suitable for use as a flame retardant additive for polyurethane foams. The composition overcomes the problems of high viscosity and precipitates forming in formulations of phosphate esters and polybromodiphenyl oxides and avoids scorch and smoldering while preparing polyurethane foams meeting the California 117 standard. In addition, the composition provides an unexpected advantage of improved efficacy and heat stability. The process for preparing the flame retarded polyurethane foam and the foam itself are also claimed.

7 Claims, No Drawings

POLYURETHANE FLAME RETARDANT

The present invention is a liquid composition suitable for incorporation into an isocyanate-polyol reaction mixture to form polyurethane foam which is flame retarded.

It is well known that plastic materials can be modified by a variety of compounds which inhibit ignition or burning characteristics to conform to prescribed standards. Key criteria in selecting a flame retardant are compatibility, conformance to flammability standards, and economics.

Compatibility with the host polymer and its manufacturing process and compatability with other additives is of prime importance for a flame retardant. Adverse effects on physical properties must be kept to a minimum. The flame retardant must be able to withstand any extreme processing, shipping or use conditions without degrading or adversely affecting the host polymer or its applications.

Examples of flammability standards for plastic materials are ASTM E-84 (Steiner Tunnel Test) and MVSS-302 for automotive interiors, and, in particular, California Bulletin 117 for furniture cushions.

This latter standard was issued in 1980 by the Department of Consumer Affairs of the State of California with the title "REQUIREMENTS, TEST PROCEDURE AND APPARATUS FOR TESTING THE FLAME RETARDANCE OF RESILIENT FILLING MATERIALS USED IN UPHOLSTERED FURNITURE." It is frequently referred to as the "California 117" standard. The standard includes both a vertical flame test and a smoldering test. The latter measures the maximum char length from a smoldering cigarette.

Flame retardants create two major problems for manufacturers of flexible polyurethane foam. Flame retardants increase the scorch problems that exist when formulating low density foams and increase the tendency for foams to smolder as measured by the California 117 standard.

As producers attempt to reduce overall costs through low density high load bearing foam, they typically increase the level of water used to form the gas to create the foam. This increases the exotherm during the foam cure. Stabilizers and formulation changes can minimize the tendency to scorch, but the addition of flame retardants generally offsets these modifications.

Scorch can be an adverse factor in the production costs. In its mild form, it can affect both the physical appearance of the foam and reduce the physical properties. This adds to the scrap rate during production. Extreme cases of scorch have in the past led to autoignition of foam in storage areas during cure.

The smoldering test of the California 117 standard created opposing problems for the foam producer. To meet the vertical flame test requirements high levels of flame retardants were needed, but their presence in the foam increased the susceptibility to smoldering ignition. A partial solution to this dilemma is to lower the porosity of the foam. This represents a trade off in foam quality and comfort factors. The foam produced is often marginal in either or both smolder resistance and physical properties. This increases the percentage of off-specification material.

Polyurethane foams are polymers formed by the chemical reaction of two liquids, isocyanates and polyols. The reaction occurs readily at room temperature in the presence of a blowing agent, such as water, a halocarbon or both. Consequently, it is necessary that the flame retardant employed is soluble in at least one of the two liquid reactants at ambient temperature and also has a sufficiently low viscosity to mix readily with the reactants at ambient temperatures before polymerization in order to form a homogeneous solution.

A recently introduced flame retardant particularly useful for flexible polyurethane is called "pentabromodiphenyl oxide" (PBDPO). It is a mixture of polybrominated diphenyl oxides and contains 71% bromine. The compound, an extremely viscous liquid, is suitable for overcoming the two major problems of low density polyurethane foam, scorch and smoldering. Because the viscosity of PBDPO is very high, greater than 100,000 mPa.s, it is difficult to pour or pump and very difficult to form a homogeneous solution when incorporated into the isocyanate-polyol reaction mixture. Consequently, a formulation has been marketed containing 85% PBDPO and 15% alkyl diphenyl phosphate by weight. The formulation contains 60% Br, 1.3% P and has a viscosity of about 3200-3500 mPa.s at 25° C. This reduced viscosity permits the liquid formulation to be poured and pumped and to be incorporated into the isocyanate-polyol reaction mixture to form a homogeneous solution which, on reaction, produces a low density polyurethane foam which overcomes the major problems of scorch and smoldering. The incorporation of phosphorus also improves the flame retardancy of the polyurethane.

Unfortunately, the reduced viscosity formulation has a disadvantage in that a precipitate forms on standing. Further, in cold weather the viscosity of the formulation often increases so that it does not flow well and it is difficult to pump and to blend into the isocyanate-polyol reaction mixture. Consequently, the polyurethane product may be nonuniform in its flame retardant properties.

The present invention, which overcomes the problems of the prior art, is a liquid composition suitable as a flame retardant additive for a polyurethane foam comprising a polybrominated diphenyl oxide and an alkylated triaryl phosphate ester, the brominated diphenyl oxide and triaryl phosphate being provided in sufficient quantity to provide between 0.7 and 4 parts by weight bromine per part by weight of triaryl phosphate. The present invention also comprises a process for producing the flame retardant low density polyurethane foam and the foam itself.

One particularly useful brominated diphenyl oxide is commercial pentabromodiphenyl oxide referred previously to as PBDPO. The compound is in reality a mixture of polybrominated diphenyl oxides and contains 71% bromine by weight. This corresponds to an average of 5 bromine atoms per molecule. Any other polybrominated diphenyl oxide could be employed, such as commercial octabromodiphenyl oxide which is also a mixture of polybrominated diphenyl oxides having an average of 8 bromine atoms per molecule.

It is well known that an alkylated triaryl phosphate generally has a greater viscosity and pour point than an alkyl diphenyl phosphate. Consequently, it is wholly unexpected that a composition of a polybrominated diphenyl oxide and an alkylated triaryl phosphate could be formulated in which the brominated diphenyl oxide is maintained as a solution and which has a sufficiently low viscosity to permit the solution to be blended uniformly into an isocyanate-polyol reaction mixture. It was further unexpected to find formulations having only from 1 to 5.7 parts by weight PBDPO (0.7 to 4 parts by weight bromine) per part by weight triaryl phosphate would impart specific flame retardant properties to a polyurethane foam than a formulation containing 5.7 parts by weight PBDPO per part by weight of an alkyl diphenyl phosphate.

It is clear that the average number of alkyl groups per molecule and the number of carbon atoms per alkyl group has little effect other than the average molecular weight of the triaryl phosphate and consequently its phosphorus content. A molecular weight range of from 330 to 450 (9% P to 7% P by weight is desirable). However, a molecular weight range of 330 to 380 is preferable (9% P to 8% P).

Yet another advantage of formulations of a triaryl phosphate and PBDPO is that the reduced volatility of the triaryl phosphates compared with the alkyldiphenyl phosphate insures the phosphorus content of the polyurethane foam is retained on exposure to elevated temperatures such as those which might be encountered during aging, shipping and storage.

It has also been found that the formulations of the present invention eliminate two processing and quality problems encountered in seating foams formulated with standard chlorinated phosphate ester flame retardants. Its superior heat stability prevents the discoloration from scorching from high-exotherm, high-water formulations, even in hot, humid weather. The formulations also reduce the susceptibility of phosphate ester-retarded foams to smoldering ignition. This latter limitation has compelled processors to produce less-resilient, closed-cell foams to pass the California 117 smoldering ignition tests. The invention also enables the more-comfortable open-cell foams to meet the California 117 standard.

The best mode for practicing the present invention will be evident to those skilled in the art from the following nonlimiting examples. Although the invention is exemplified in greatest detail with a mixture of polybrominated diphenyl oxides having an average of 5 bromine atoms per molecule, it will be clear to one skilled in the art that any polybrominated diphenyl oxide may be employed in the present invention.

Unless otherwise indicated the proportions herein are parts by weight. For example, an 85/15 ratio indicates 85 parts by weight of the first mentioned compound and 15 parts by weight of the second mentioned compound. Similarly, 10 php indicates 10 parts by weight of an additive per hundred parts by weight of the polyol employed in the polyurethane.

Unless otherwise specified, the alkylated triaryl phosphate ester (TAP) employed in the experiments was a commercial ester formed from alkylated phenol providing on the average one isopropyl group per triaryl phosphate molecule. The product is marketed by FMC Corporation under the tradename Kronitex 50 triaryl phosphate and has an average molecular weight of 375 and contains 8.3% phosphorus. The alkyl diphenylphosphate (ADP) employed was a commercial 2-ethylhexyldiphenyl phosphate with a molecular weight of 362 containing 8.5% phosphorus. The TAP was selected because it is a commercial product with a similar molecular weight and phosphorus content to the ADP.

Flexible polyurethane foams were prepared by adding a blend of a PBDPO and a phosphate to a published model formulation (J. Fire Retardant Chem., 9, p. 155–160, August 1982)

100 parts polyol (U.C. Niax 16-56)
16–18 parts Flame Retardants
4.5 parts water
5.7 parts Freon 11A
0.14 parts Abbot polycat
0.9 part Goldschmidt B-8202
0.64 part M&T T-10
57.4 parts toluenediisocyanate (110 index).

The reactants were mixed to form a foam with a density of 2.4 kg/m$^3$ (1.5 pcf). Test specimens were evaluated according to the California 117 procedures.

EXAMPLE 1

Blends of PBDPO with either alkyl diphenyl phosphate (ADP) or an alkylated triaryl phosphate (TAP) were prepared and placed in vials to a depth of 28 mm (1.5 in). After standing for one week the precipitate was evaluated on an arbitrary scale of 1 to 5, 1 indicating insufficient precipitate to cover the bottom of the vial, to 5 indicating about 5 mm or more ($\frac{1}{4}$ in.) of crystals. The results are presented as Table I.

EXAMPLE 2

Blends of PBDPO and phosphate ester were incorporated at 16 php into a polyurethane foam. Viscosity of the blends was measured at room temperature and reported in Table II together with the California 117 tests.

For comparative purposes a sample of polyurethane foam prepared in the laboratory using a commercial 85/15 PBDPO/ADP formulation was included as comparative Run A and similar published information from the J. Fire Retardant Chem. as comparative Run B.

After sitting at room temperature for one week the crystals appeared in 85/15 PBDPO/ADP samples. Although the viscosity of the three "identical" samples (Runs 1, A and B) was the same, significant differences are observed in the California Standard 117 test data. One explanation for this surprising observation is that the presence of PBDPO solids resulted in a nonuniform of PBDPO and ADP in the polyurethane foam. In every case fewer crystals appeared in blends containing TAP than having blends the same ratio containing ADP.

The Runs 1 to 6 are also significant in that the flame retardant efficacy of the PBDPO/ADP blends decreases as the PBDPO/ADP ratio decreases while the efficacy of PBDPO/TAP blends remains about constant over the experimental range. Even more significant is that the PBDPO/TAP blends are unexpectedly superior flame retardants compared to the PBDPO/ADP blends when incorporated into a polyurethane foam.

EXAMPLE 3

Polyurethane foam samples were prepared containing PBDPO/phosphate blends at 16 php and 18 php. The burn time and char length samples aged at 104° C. for 24 hours are reported as Table III. The data show that the PBDPO/TAP blends not only are more effective than the PBDPO/ADP blends at the levels tested (16 and 18 php), but also that it is clear that even lower levels, such as 14 php, would be useful. At this level of use the preferred 75/25 PBDPO/TAP ratio would be equivalent to 10 parts by weight PBDPO and 3.5 parts by weight TAP php in the polyurethane foam; the preferred 85/15 ratio would be equivalent to 12 parts by weight PBDPO and 2 parts by weight TAP php in the polyurethane foam.

EXAMPLE 4

Polyurethane foam samples were prepared containing 16 php PBDPO/TAP blends. The samples were aged 24 hours at 104° C. simulating temperatures encountered during shipping or encountered in a closed vehicle or building. The flame retardancy was determined and the results are presented in Table IV.

From these data it is clear that the PBDPO/TAP blends do not lose their flame retardant properties when exposed to elevated temperatures. The low vapor pressure of the TAP ester compared with the ADP ester (0.008 mm at 150° C. compared with 0.2 mm) suggests that in actual storage and use the flame retardancy of the polyurethane foam containing a PBDPO/TAP would be maintained for a longer period of time than a PBDPO/ADP blend.

COMPARATIVE EXAMPLE

Foam containing 16 php of a 50/50 blend of PBDPO/TAP was prepared and found to have a 32 sec. burn time and a 11.7 cm char length; a foam containing 16 php of a 50/25/25 blend of PBDPO/TAP/tris(-butoxyethyl)phosphate had a 184 sec. burn time and a char length of 24 cm. This comparative example illustrates that a trialkyl phosphate such as tris(butoxyethyl)phosphate is not as effective a flame retardant with PBDPO as a TAP. The Comparative Example also demonstrates that replacing alkyl groups with aryl groups improves flame retardancy.

TABLE I
PRECIPITATION OF PENTABROMODIPHENYL OXIDE FROM FLAME RETARDANT BLEND

|  | Weight Ratio | Relative Precipitate |
|---|---|---|
| Commercial Sample | 85/15 | 5 |
| PBDPO/ADP | 85/15 | 5 |
|  | 80/20 | 3 |
|  | 75/25 | 2 |
| PBDPO/TAP | 85/15 | 3 |
|  | 80/20 | 1 |
|  | 75/25 | 1 |
|  | 50/50 | 1 |

TABLE II
PHOSPHATE ESTER BLENDS OF PBDPO VISCOSITY AND FLAME RETARDANCY

| | | | | Foam with 16 php FR Flame Ratardancy California Standard 117 | |
|---|---|---|---|---|---|
| FR Blend | | | Viscosity | Burn Time | Char Length |
| No. | Composition | Ratio | mPa.s | sec. | cm (in.) |
| 1. | PBDPO/ADP | 85/15 | 3,500 | 16 | 20 (8) |
| 2. | PBDPO/ADP | 80/20 | 1,400 | 20 | 25 (10) |
| 3. | PBDPO/ADP | 75/25 | 500 | 21 | 23 (9) |
| 4. | PBDPO/TAP | 85/15 | 14,000 | 3 | 8 (3) |
| 5. | PBDPO/TAP | 80/20 | 5,000 | 2 | 8 (3) |
| 6. | PBDPO/TAP | 75/25 | 2,200 | 4 | 10 (4) |
| PBDPO/ADP* | | 85/15 | | | |
| A. (Lab. Test) | | | 3,500 | 19 | 23 (9) |
| B. (Published) | | | 3,500 | 5 | 15 (6) |
| Cal. 117 Specification | | | | 5 max. | 15 (6)max. |

*Commercial Sample

TABLE III
FLAME RETARDANCY OF POLYURETHANE FOAM SAMPLES CONTAINING 16 AND 18 php PBDPO/PHOSPHATE ESTER BLENDS AND AGED 24 HOURS AT 104° C.

| | | | FOAM | | | |
|---|---|---|---|---|---|---|
| | | | 16 php FR | | 18 php FR | |
| | BLEND | | Burn Time | Char Length | Burn Time | Char Length |
| No. | Composition | Ratio | sec. | in. | sec. | in. |
| 1. | PBDPO/ADP* | 85/15 | 11.0 | 7.3 | 10.4 | 4.0 |
| 2. | PBDPO/ADP | 85/15 | 17.4 | 7.1 | 11.0 | 5.0 |
| 3. | PBDPO/ADP | 75/25 | 18.0 | 8.7 | — | — |
| 4. | PBDPO/TAP | 85/15 | 4.0 | 3.2 | 5.5 | 4.0 |
| 5. | PBDPO/TAP | 75/25 | 2.8 | 2.9 | 1.0 | 2.3 |

*Commercial Sample

TABLE IV
FLAME RETARDANT STABILITY AT 104° C. OF POLYURETHANE FOAMS

| | | | Polyurethane Foam Containing 16 php of Flame Retardant | | | |
|---|---|---|---|---|---|---|
| | | | As Produced | | Aged 24 Hr. at 104° C. | |
| | Blend | | Burn Time | Char Length | Burn Time | Char Length |
| No. | Composition | Ratio | sec. | cm (in.) | sec. | cm (in.) |
| 1. | PBDPO/ADP* | 85/15 | 7 | 10 (4) | 11 | 19 (7.3) |
| 2. | PBDPO/ADP | 85/15 | 24 | 23 (9) | 17 | 18 (7.1) |
| 3. | PBDPO/ADP | 75/25 | 21 | 21 (8.2) | 18 | 22 (8.7) |
| 4. | PBDPO/TAP | 85/15 | 13 | 11 (4.5) | 4 | 8 (3.2) |
| 5. | PBDPO/TAP | 75/25 | 4.5 | 8 (3) | 3 | 7 (2.9) |

*Commercial Sample

I claim:

1. A liquid composition suitable as a flame retardant additive for a polyurethane foam consisting essentially of a polybrominated diphenyl oxide and an alkylated triaryl phosphate ester, the polybrominated diphenyl oxide and triaryl phosphate being provided in sufficient quantity to provide about 0.7 to 4 parts by weight bromine per part by weight of triaryl phosphate.

2. The composition of claim 1 wherein said triaryl phosphate ester is an alkylated triphenyl phosphate having an average molecular weight of between 330 and 450.

3. The composition of claim 1 wherein the polybrominated diphenyl oxide is pentabromodiphenyl oxide.

4. The composition of claim 2 wherein the polybrominated diphenyl oxide is pentabromodiphenyl oxide.

5. The composition of claim 1 wherein said triaryl phosphate ester is an alkylated triphenyl phosphate having an average molecular weight of between 360 and 380.

6. A method for producing a flame retardant polyurethane by incorporating at least 14 php of the composition of claim 1 into an isocyanate-polyol reaction mixture.

7. A flame retardant polyurethane foam comprising at least 10 parts by weight pentabromodiphenyl oxide and at least 2 parts by weight of a triaryl phosphate per hundred parts by weight polyol.